July 17, 1962
E. C. TERRY ETAL
3,044,445
HEATED DRINKING TROUGH
Filed March 18, 1960
2 Sheets-Sheet 1
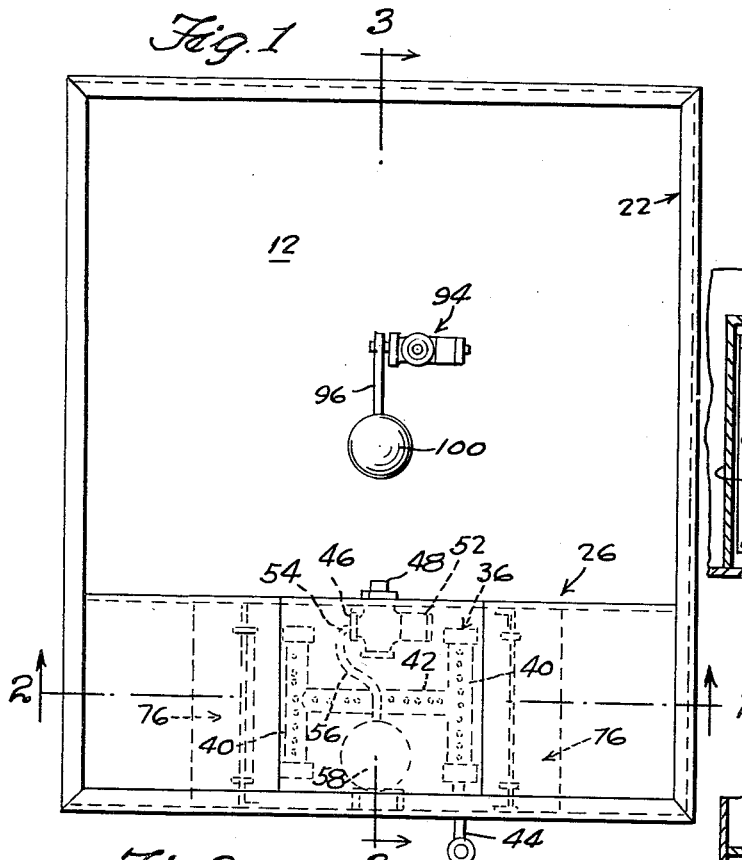
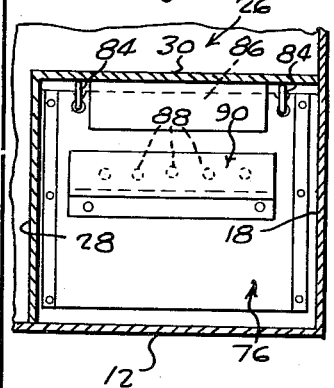
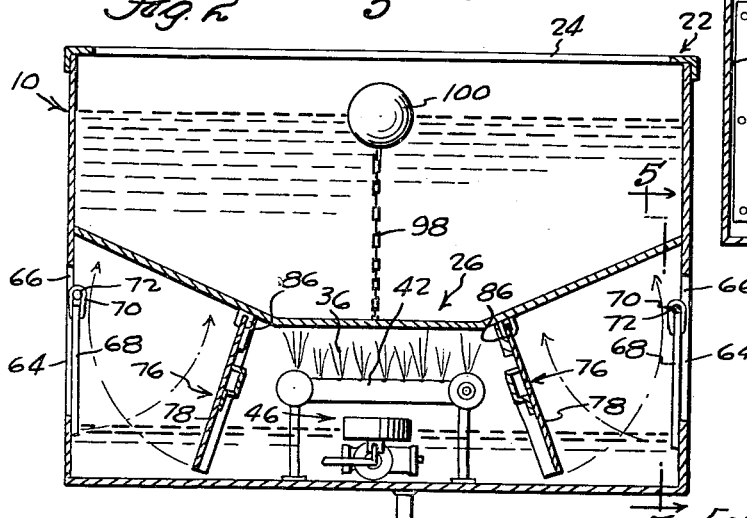
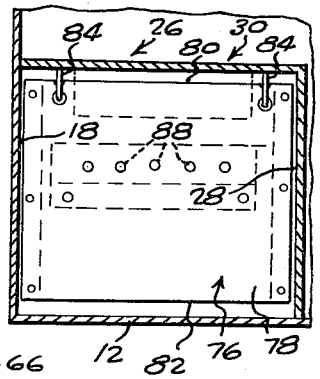
INVENTORS
EDWIN C. TERRY, &
BY ROBERT C. TERRY
McMorrow, Berman & Davidson
ATTORNEYS

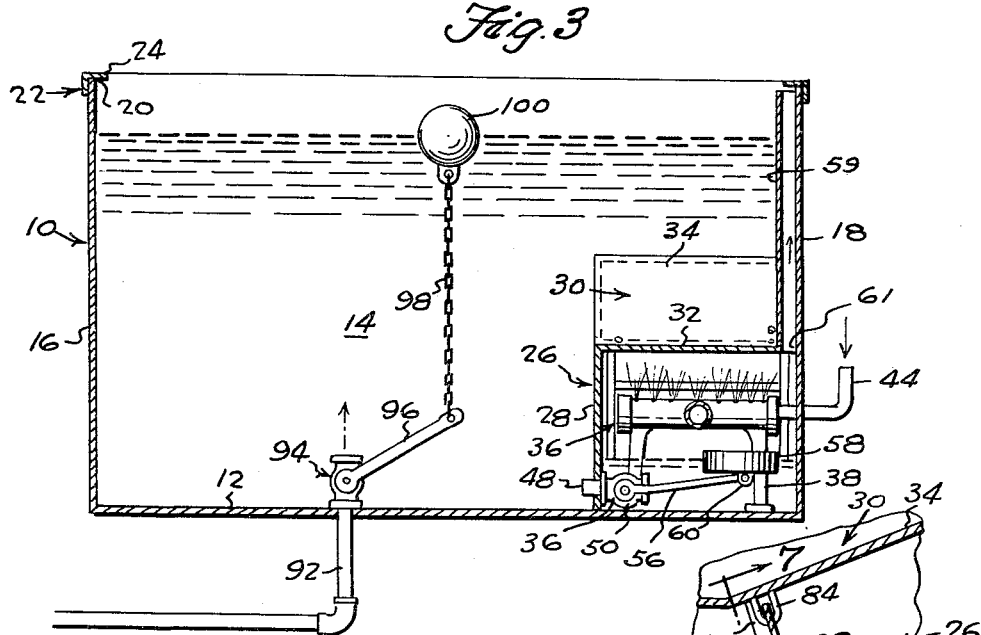

United States Patent Office 3,044,445
Patented July 17, 1962

3,044,445
HEATED DRINKING TROUGH
Edwin C. Terry and Robert C. Terry, both % Terry Bros. Repair & Supply, Ursa, Ill.
Filed Mar. 13, 1960, Ser. No. 15,893
14 Claims. (Cl. 119—73)

This invention relates to a novel and improved heated drinking trough.

The primary object of the invention is to provide a more reliable, efficient, and economical device of this kind, which is unusually rugged in construction so as to be long-lasting in service.

Another object of the invention is the provision of a device of the character indicated above which comprises a relatively large water reservoir tank, and a substantially smaller drinking water tank or chamber, which is accessible to animals through walls of the reservoir tank, and wherein a burner is protectively enclosed, and a float control valve in the chamber which is in communication with the reservoir tank and the drinking chamber, the valve acting to maintain a predetermined level of drinking water in the chamber and providing for the presence and availability of water in the chamber substantially independently of the volume or level of water in the reservoir tank.

A further object of the invention is to provide a device of the character indicated above wherein the provision of a relatively large reservoir tank and the relatively small heated drinking water chamber enables the storage of a large amount of immediately available water in the reservoir tank, and at the same time avoiding uneconomical heating of a relatively large volume of water, subject to rapid cooling in the reservoir tank, and more efficiently and economically heating a relatively small volume of water in the drinking tank or chamber.

Other important objects and advantageous features of the invention will be apparent from the following description and the accompanying drawings, wherein, for purposes of illustration only, a specific form of the invention is set forth in detail.

In the drawings:

FIGURE 1 is a top plan view of a device of the invention, showing components of the drinking water tank or chamber, the heater, and the float valve in phantom lines;

FIGURE 2 is a transverse vertical section taken on the line 2—2 of FIGURE 1;

FIGURE 3 is a vertical longitudinal section taken on the line 3—3 of FIGURE 1;

FIGURE 4 is a fragmentary side elevation of the device, showing a drinking water chamber access opening closed by a swingable door;

FIGURE 5 is a fragmentary vertical longitudinal section taken on the line 5—5 of FIGURE 2;

FIGURE 6 is a fragmentary and enlarged vertical transverse section taken through the chamber and a burner protecting flap; and FIGURES 7 and 8 are vertical longitudinal sections taken through the chamber.

Referring in detail to the drawings, wherein like numerals designate like parts throughout the several views, the illustrated device comprises a preferably rectangular water reservoir tank 10 having a bottom wall 12, upstanding sidewalls 14, and upstanding first and second end walls 16 and 19, respectively. The walls have a common upper edge 20 along and to which is fixed a continuous reinforcing angle iron 22, whose horizontal flange 24 extends inwardly from the walls and defines the open top of the tank 10. It will be understood that the cross section and shape of the tank 10 is not critical, and that the same could be other than rectangular.

Within the reservoir tank 10, at the second end thereof, and spaced downwardly from the top of the tank 10, is a relatively small, transversely elongated drinking water chamber 26 which is composed of an inner vertical side wall 28, spaced parallel from the reservoir tank second end wall 18, and extending between the side walls 14 and the bottom wall 12; and an irregularly-shaped and imperforate top wall 30. The chamber top wall, as shown in FIGURE 2, has a flat horizontal middle portion 32 and upwardly and laterally outwardly inclined end portions 34. The top wall 30 extends between and is fixed to the inner side wall 28, the end wall 18, and the sidewalls 14, and is spaced above the bottom wall 12.

Mounted in the chamber 26 on the bottom wall 12 and beneath and spaced downwardly from the horizontal top wall portion 32, is a horizontal burner 36, which is spaced upwardly from the bottom wall 12, on such as legs 38. The burner 36 is preferably an H-shaped gas burner, arranged transversely of the reservoir tank 10, like a modified #204C Johnson burner, and having parallel perforated arms 40, extending crosswise of the chamber 36 and connected by a longitudinal perforated member 42, the fuel for the burner being supplied thereto, as by a pipe 44 extending through the second end wall 18 and connected to one of the arms 40. Supply of fuel, such as gas, to the burner 36 can be controlled by any suitable means, not shown.

Mounted on the inner sidewall 28 of the chamber 26, beneath the burner 36, is a float valve, generally designated 46, which has a water intake tube 48 communicating with the interior of the reservoir tank 10, on a level close to the bottom wall 12, so as to be capable of intaking water from the tank 10, even when the water in the tank is nearly exhausted. The float valve 46 further comprises a valve body 50 having a water outlet tube 52, opening to the interior of the chamber 26, and a cock 54 on which a generally horizontal float arm 56 is fixed, has a flat float 58 pivoted on its free end, as indicated at 60. Rise of intake in water in the chamber 26 to a level indicated at 62, below the burner 36, serves to elevate the float and close the valve 46; and fall of the float opens the valve 46 and produces restoration of the proper level of drinking water in the chamber 26. A rectangular vertical flue 59 is fixed to the second end wall 18, above the chamber 26 and leads to the open upper end of the tank 10, from an opening 61 provided in the chamber top wall 32, and vents the products of combustion from the burner 36, without substantial loss of heat from the chamber.

Easy access for animals to the drinking water in the chamber 26 is provided by generally rectangular access openings 64, formed in the sidewalls 14, in registry with related ends of the chamber 26, and spaced about the bottom wall 14, substantially at the level of the drinking water in the chamber 26. The access openings 64 also serve to supply outside air to the burner 36. Normally closing the openings 64, except for minor upper portions 66 of the openings, which remain open to supply combustion air to the burner, are flat gravity-closed doors 68 which are disposed at the inner sides of the sidewalls 14. Fixed around the upper edges of the doors 68 are vertically elongated upstanding loops 70 which are journaled on horizontal hinge rods 72 which are fixed, at their ends to the inner sides of the sidewalls 14 on a level below the tops of the access openings 64, as indicated at 74 in FIGURE 5.

Burner and float valve protecting flaps 76 are suspended from the inclined chamber top wall portions 34, near the ends of the middle portion 32, and normally extend at downward and outward angles, as shown in FIGURE 2. The flaps 76 are similar but are reversed with respect to each other, and comprise flat rectangular plates 78 of substantially the same area as the cross section of the chamber 26, and have upper edges 80 and lower edges 82. Elongated U-shaped loops 84 are secured to and extend downwardly from the top wall portions 34 at downward and outward angles, and at the outer sides of similarly angled stop flanges 86 fixed to the wall portions 34. The loops 84 are fully engaged through holes in the flap plates 78 at the upper edges 80 thereof, so that the flaps 76 can be swung upwardly and outwardly, as indicated by arrows in FIGURE 2, to afford access, through the access openings 64, to the burner 36 and the float valve 46, when desired. When in their depressed operative positions, the flaps bear against the stop flanges 86, with the lower ends 82 of the flap plates 78 spaced above the bottom wall 12.

The flap plates 78 are provided, at their mid-height, with horizontal rows of air-passing holes 88, and horizontal open top shields 90 are fixed to the inner sides of the plates 78, below the holes 88, and extend upwardly and along the holes 88, so as to prevent clogging of the air holes 88 by water, as water splashes in the chamber 26, while being intaken through the float valve body tube 52. The described arrangement of the U-shaped loops 84 relative to the flap plates 78, provides that when the flaps 76 are swung upwardly and outwardly, they will remain in such positions, while work is being performed on the burner 36 and/or the float valve 46. When the flaps 76 are down, animals drinking through the access openings 64 are prevented from reaching and contacting the burner or the float valve.

Water is supplied to the reservoir tank 10 by a pipe 92 leading through the bottom wall 12 to a preferably centered shut-off valve 94 having an operating arm 96 to which is connected a chain 98, which is secured at its upper end to a ball float 100, the chain 98 being relatively long, so that water can rise in the tank 10 to a level near the open top of the tank and above the chamber 26, before the shut-off valve is closed by the rise of the float 100.

Animals can readily drink from the chamber 26 simply by pushing the doors 68 inwardly and drinking the water present in the chamber 26. As the animals withdraw from the doors 68, the doors gravitate to their closed positions and close the major portions of the access openings 64, and protect the water in the chamber 26 from outside dust and dirt, as well as rain and snow.

While there has been shown and described herein a preferred form of the invention, it is to be understood that the invention is not necessarily confined thereto, and that any change or changes in the structure of and in the relative arrangements of components thereof are contemplated as being with the scope of the invention as defined by the claims appended hereto.

What is claimed is:

1. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber.

2. A heated drinking trough comprising a relatively large water reservoir tank, a relatively small drinking water chamber within said reservoir tank said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein and animal access means on said one tank wall affording access to the interior of the chamber, said burner being located centrally in the chamber.

3. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, and said float valve being located beneath the burner, said chamber having end walls having access openings, and protective flaps hinged on said chamber at opposite sides of the burner, said flaps being located between the burner and spaced from and facing said access openings.

4. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, and said float valve being located beneath the burner, said chamber having end walls having access openings, and protective flaps hinged on said chamber at opposite sides of the burner, said flaps being located between the burner and spaced from and facing said access openings, and gravity closed doors mounted on the tank and closing major portions of said access openings.

5. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said burner being located centrally of the chamber, and a vertical flue leading upwardly from said chamber.

6. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said burner being located centrally of the chamber, and protective flaps hinged on said chamber at opposite sides of the burner and the float valve, said flaps being located between the burner and the float valve and spaced from and facing said access means, said flaps having air passing opening means therein, and stops on the chamber at the inward sides of the flaps for stopping the flaps in normal vertical positions extending across the interior of the chamber.

7. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said burner being located centrally of the chamber, and protective flaps hinged on said chamber at opposite sides of the burner and the float valve, said flaps being located between the burner and the float valve and spaced from and facing said access means, said flaps having air passing opening means therein, and stops on the chamber at the inward sides of the flaps for stopping the flaps in normal vertical positions extending across the interior of the chamber, and shields on the inward sides of the flaps extending across said air passing means.

8. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said burner being located centrally of the chamber, and protective flaps hinged on said chamber at opposite sides of the burner and the float valve, said flaps being located between the burner and the float valve and spaced from and facing said access means, said flaps having air passing opening means therein, and stops on the chamber at the inward sides of the flaps for stopping the flaps in normal vertical positions extending across the interior of the chamber, and shields on the inward sides of the flaps extending across said air passing means, said flaps being hinged at their upper ends on the chamber.

9. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, and float controlled valve means on and communicating with said reservoir and connectible to a source of water, said valve means having a float located above the level of the chamber.

10. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said reservoir having a bottom wall, sidewalls, and first and second end walls, said chamber comprising a top wall spaced downwardly from the upper end of the tank and a vertical inner sidewall spaced from and extending along said second end wall, portions of said bottom wall, tank sidewalls, and second end wall being related walls of the chamber.

11. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said reservoir having a bottom wall, sidewalls, and first and second end walls, said chamber comprising a top wall spaced downwardly from the upper end of the tank and a vertical inner sidewall spaced from and extending along said second end wall, portions of said bottom wall, tank sidewalls, and second end wall being related walls of the chamber, said chamber top wall having a flat horizontal middle portion and outwardly and upwardly inclined end portions, said inclined end portions overlying said access openings.

12. A heated drinking trough comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said reservoir having a bottom wall, sidewalls, and first and second end walls, said chamber comprising a top wall spaced downwardly from the upper end of the tank and a vertical inner sidewall spaced from and extending along said second end wall, portions of said bottom wall, tank sidewalls, and second end wall being related walls of the chamber, said chamber top wall having a flat horizontal middle portion and outwardly and upwardly inclined end portions, said inclined end portions overlying said access openings, and protective flaps hingedly suspended from said top wall and spaced inwardly from said access openings, said flaps being located at opposite sides of the burner.

13. A heated drinking trough, comprising a relatively large water reservoir tank, a relatively small drinking water chamber within said reservoir tank, said chamber having a wall which is one wall of the tank and having a top wall spaced downwardly from the top of the water tank, a float valve within said chamber and providing a water level line spaced below the chamber top wall and controlled communication between the reservoir tank and the chamber, and a burner mounted within said chamber above the water line therein, and animal access means on said one tank wall affording access to the interior of the chamber, said reservoir having a bottom wall, sidewalls, and first and second end walls, said chamber comprising a top wall spaced downwardly from the upper end of the tank and a vertical inner sidewall spaced from and extending along said second end wall, portions of said bottom wall, tank sidewalls, and second end wall being related walls of the chamber, said chamber top wall having a flat horizontal middle portion and outwardly and upwardly inclined end portions, said inclined end portions overlying said access openings, and protective flaps hingedly suspended from said top wall and spaced inwardly from said access means, said flaps being located at opposite sides of the burner and the float valve, said burner being located beneath said middle top wall portion.

14. A heated drinking trough comprising a water reservoir tank having an end wall and side walls, a drinking water chamber within the tank and extending along said end wall between said side walls, said chamber being substantially smaller in cross section than the tank and having a top wall spaced downwardly from the top of the tank, the side walls of the tank having access openings for ends of the chamber, a burner supported within the chamber and spaced beneath its top wall, and float valve means providing sole communication between the tank and the chamber and operative to provide a water level within the chamber which is spaced below the burner.

References Cited in the file of this patent

UNITED STATES PATENTS

| | | |
|---|---|---|
| 1,269,048 | Butcher | June 11, 1918 |
| 2,490,824 | Meisner | Dec. 13, 1949 |
| 2,532,999 | Donahoe et al. | Dec. 5, 1950 |
| 2,635,580 | Donahoe et al. | Apr. 21, 1953 |